United States Patent Office 3,535,370
Patented Oct. 20, 1970

3,535,370
{[2-(HALOMETHYL)ALKANOYL]PHENOXY}
ALKANOIC ACIDS
Edward J. Cragoe, Jr., Lansdale, Pa., assignor to Merck
& Co., Inc., Rahway, N.J., a corporation of New Jersey
No Drawing. Filed Aug. 3, 1967, Ser. No. 658,022
Int. Cl. C07c 65/20, 103/26
U.S. Cl. 260—473                                13 Claims

ABSTRACT OF THE DISCLOSURE

{[2 - (halomethyl)alkanoyl]phenoxy}alkanoic acids which may be substituted in the alkanoyl chain by trifluoromethyl-lower alkyl, cycloalkyl, aryl, aralkyl or aryloxy. The products are diuretics and saluretics which may be used in the treatment of conditions associated with electrolyte and fluid retention.

The {[2-(halomethyl)alkanoyl]phenoxy}alkanoic acid products are obtained by treating a solution of a [(2-methylenealkanoyl)phenoxy]alkanoic acid with an hydrogen halide in a suitable solvent.

---

This invention relates to a new class of chemical compounds which can be described generally as {[2-(halomethyl)alkanoyl]phenoxy}alkanoic acids and to the nontoxic, pharmacologically acceptable esters and amide derivatives thereof.

Pharmacological studies show that the instant products are effective diuretic and saluretic agents which can be used in the treatment of conditions associated with electrolyte and fluid retention and hypertension. When administered in therapeutic dosages in conventional vehicles the instant products effectively reduce the amount of sodium and chloride ions in the body, lower dangerous excesses of fluid levels to acceptable limits and, in general, alleviate conditions associated with edema.

The products of this invention are compounds having the following general formula:

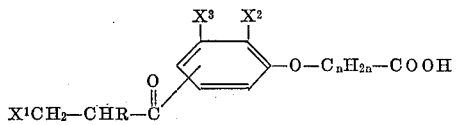

wherein R is alkyl, for example, lower alkyl such as methyl, ethyl, propyl, isopropyl, isobutyl, etc.; trifluoromethyl substituted lower alkyl, for example, 2,2,2-trifluoroethyl, 2,2,2-trifluoroisopropyl, etc.; cycloalkyl, for example, lower cycloalkyl containing from 5–6 nuclear carbon atoms such as cyclopentyl, cyclohexyl, 4-methylcyclohexyl, etc.; mononuclear aryl, for example, phenyl, etc.; mononuclear aralkyl, for example, benzyl, 4-chlorobenzyl, 4-propylbenzyl, etc., or mononuclear aryloxy, for example, phenoxy, etc.; $X^1$ is halogen, for example, chloro, bromo, iodo, etc.; $X^2$ and $X^3$ are similar or dissimilar members selected from hydrogen, halogen, for example, chloro, bromo, fluoro, iodo, etc., lower alkyl, for example, methyl, ethyl, etc., and taken together, two X radicals on adjacent carbon atoms of the benzene ring may be joined to form an hydrocarbylene chain, i.e., a divalent organic radical composed solely of carbon and hydrogen, containing from 3–4 carbon atoms between their points of attachment, for example, trimethylene, tetramethylene, 1,3-butadienylene, i.e.,

—CH=CH—CH=CH— and $n$ is an integer having a value of 1–4; and the nontoxic, pharmacologically acceptable alkyl esters, amide, lower alkylamide and di-lower alkylamide derivatives thereof.

A preferred embodiment of this invention relates to the {4-[2-(halomethyl)alkanoyl]phenoxy}acetic acid products having the following general formula:

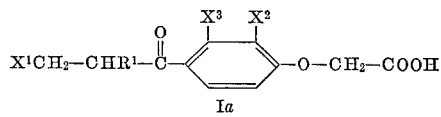

wherein $R^1$ is lower alkyl or trifluoromethyl substituted lower alkyl; $X^1$ is halogen; $X^2$ is hydrogen, halogen or lower alkyl and $X^3$ is halogen or lower alkyl, and the nontoxic pharmacologically acceptable lower alkyl ester, amide, lower alkylamide and di-lower alkylamide derivatives thereof. The foregoing class of compounds exhibits particularly good diuretic and saluretic activity and represents a preferred subgroup of compounds within the scope of this invention.

The instant products (I) are conveniently obtained by treating a solution of [(2-methylenealkanoyl)phenoxy]-alkanoic acid (II, infra) with an appropriate hydrogen halide. The reaction is conducted in any medium in which the reactants are reasonably soluble and which is substantially inert with respect to the reagents employed as, for example, in ether, dioxane, tetrahydrofuran, chloroform, carbon tetrachloride, bromoform, etc., and the hydrogen halide may either be added per se to the reaction mixture or can be added in a suitable solvent such as ether, tetrahydrofuran, etc. The following equation illustrates this method of preparation:

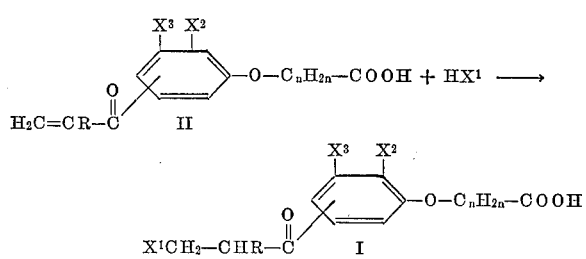

wherein R, $X^1$, $X^2$, $X^3$ and $n$ are as defined above.

The {[2-(halomethyl)alkanoyl]phenoxy}alkanoic acid products (I) of the invention are generally obtained as crystalline solids and may be purified by recrystallization from a suitable solvent or mixture of solvents. Suitable solvents include, for example, benzene, cyclohexane, isopropyl alcohol, mixtures of hexane and benzene, etc.

The [(2 - methylenealkanoyl)phenoxy]alkanoic acids employed as starting materials in the foregoing preparative method are known compounds which are disclosed in our U.S. Pat. No. 3,255,241, issued June 7, 1966.

Esters and amides within the scope of this invention include, for example, the alkyl ester and the amide, monoalkylamide, dialkylamide and heterocyclic amide derivatives as, for example, amides derived from such heterocyclic amines as pyrrolidine, piperidine, morpholine, etc.; which esters and amides are prepared in a manner similar to that described above for the preparation of the carboxylic acid products (I) by substituting the appropriate ester or amide starting material for the [(2-methylenealkanoyl)phenoxy]acetic acid reactant (II) depicted in the preceding equation.

The foregoing and other equivalent methods for the preparation of the esters and amides of the instant products will be apparent to those having ordinary skill in the art and, to the extent that the said derivatives are both nontoxic and physiologically acceptable to the body system, the said esters and amides are the functional equivalent of the {[2-(halomethyl)alkanoyl]phenoxy}alkanoic acid products (I).

The examples which follow illustrate the {[2-(halomethyl)alkanoyl]phenoxy}alkanoic acids and the ester and amide derivatives thereof and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

{3-chloro-4-[2-(bromomethyl)butyryl]phenoxy}acetic acid

[3 - chloro - 4 - (2-methylenebutyryl)phenoxy]acetic acid (5 g., 0.0186 mole) is dissolved in ethyl ether (25 ml.) and treated with a solution of ethyl ether (25 ml.) saturated with hydrogen bromide. An exothermic reaction occurs with the deposition of a solid. After an hour the solid is removed by filtration, washed with ether and dried to yield 5.25 g. of product, M.P. 137–140.5° C. Concentration and cooling of the mother liquors yields an additional 0.66 g. of product bringing the total yield of {3 - chloro - 4 - [2-(bromomethyl)butyryl]phenoxy} acetic acid to 5.91 g. (91%). Two recrystallizations from benzene gives 4.35 g. of pure {3-chloro-4-[2-(bromomethyl)butyryl]phenoxy}acetic acid, M.P. 140–142° C.

*Analysis.*—Calc'd for $C_{13}H_{14}BrClO_4$ (percent): C, 44.06; H, 4.04; Br, 22.86. Found (percent): C, 44.97; H, 3.94; Br, 22.62.

EXAMPLE 2

{2,3-dichloro-4-[2-(chloromethyl)butyryl]phenoxy}acetic acid

A solution of [2,3-dichloro - 4 - (2-methylenebutyryl)phenoxy]acetic acid (3.03 g., 0.01 mole) in ethyl ether (25 ml.) is treated with a saturated solution of hydrogen chloride in ether (25 ml.) and kept at room temperature for 18 hours.

The solvent is removed by distillation in vacuo and the residue recrystallized from benzene to yield 2.8 g. (83%) of {2,3 - dichloro - 4 - [2-(chloromethyl)butyryl]phenoxy}acetic acid, M.P. 128–129° C.

*Analysis.*—Calc'd for $C_{13}H_{13}Cl_3O_4$ (percent): C, 45.98; H, 3.86; Cl, 31.32. Found (percent): C, 46.13; H, 3.98; Cl, 31.12.

EXAMPLE 3

{3-chloro-4-[2-(chloromethyl)butyryl]phenoxy}acetic acid

[3 - chloro - 4 - (2-methylenebutyryl)phenoxy]acetic acid (2 g., 0.00744 mole) is dissolved in dry ethyl ether (20 ml.) and a solution of ethyl ether (20 ml.) saturated with hydrogen chloride is added. A white precipitate soon forms and after standing for an hour at ambient temperature the stoppered mixture is refrigerated at 5° C. for an additional hour. The solid is removed by filtration, washed with dry ether and dried to yield 1.75 g. of {3-chloro - 4 - [2 - (chloromethyl)butyryl]phenoxy}acetic acid (77%), M.P. 139.5–141.5° C. Concentration and cooling of the filtrate yields an additional 0.45 g. (19%) of product. The combined material is recrystallized from benzene to yield 2.2 g. M.P. 141.5–142.5° C. of pure {3-chloro - 4 - [2-(chloromethyl)butyryl]phenoxy}acetic acid.

*Analysis.*—Calc'd for $C_{13}H_{14}Cl_2O_4$ (percent): C, 51.17; H, 4.62; Cl, 23.24. Found (percent): C, 51.64 H, 4.92; Cl, 22.90.

EXAMPLE 4

{3-[2-(bromomethyl)propionyl]phenoxy}acetic acid

By substituting (3-methacryloylphenoxy)acetic acid for the [3 - chloro - 4 - (2-methylenebutyryl)phenoxy]acetic acid recited in Example 1 and following the procedure described therein the product {3-[2-(bromomethyl)propionyl]phenoxy}acetic acid is obtained.

EXAMPLE 5

{2-[2-(bromomethyl)propionyl]-5-chlorophenoxy}acetic acid

By substituting (2-methacryloyl - 5 - chlorophenoxy)-acetic acid for the [3-chloro-4-(2-methylenebutyryl)phenoxy]acetic acid recited in Example 1 and following the procedure described therein the product {2-[2-(bromomethyl)propionyl] - 5 - chlorophenoxy}acetic acid is obtained.

EXAMPLE 6

{3-chloro-4-[2-(bromomethyl)butyryl]phenoxy}acetamide

By substituting [3 - chloro - 4 - (2 - methylenebutyryl)phenoxy]acetamide for the [3 - chloro - 4 - (2-methylenebutyryl)phenoxy]acetic acid recited in Example 1 and following the procedure described therein the product {3-chloro - 4 - [2 - bromomethyl)butyryl]phenoxy}acetamide is obtained.

EXAMPLE 7

Methyl {3-chloro-4-[2-(bromomethyl))butyryl]phenoxy}tcetate

By substituting methyl [3-chloro - 4 - (2-methylenebutyryl)phenoxy]acetate for the [3 - chloro-4-(2-methylenebutyryl)phenoxy]acetic acid recited in Example 1 and following the procedure described therein the product methyl {3 - chloro - 4 - [2 - (bromomethyl)butyryl]phenoxy}acetate is obtained.

In a manner similar to that described in Example 1 for the preparation of {3-chloro-4-[2-(bromomethyl)butyryl]phenoxy}acetic acid, all of the products of this invention may be obtained. Thus, by substituting the appropriate [4-(2 - methylenealkanoyl)phenoxy]alkanoic acid (IIa, infra) and hydrogen halide for the [3-chloro-4-(2 - methylenebutyryl)phenoxy]acetic acid and hydrogen bromide reactants disclosed in Example 1 and following the procedure described therein all of the products of this invention may be obtained. The following equation illustrates the reaction of Example 1 and, together with Table I, infra, illustrate the starting materials (IIa)

of the process and the products (Ib, infra) derived therefrom:

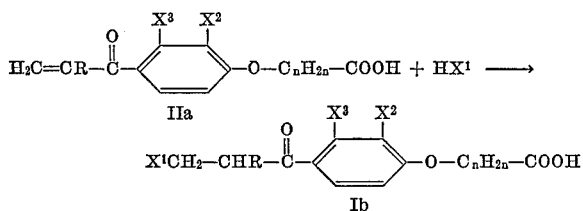

be necessary to mix more than 200 mg. of ingredients together, larger capsules may be employed. Compressed tablets, pills or other desired unit dosages can be prepared to incorporate the compounds of this invention by conventional methods, and, if desired, can be made up as elixirs or as injectable solutions by methods well known to pharmacists.

It is also within the scope of this invention to combine two or more of the compounds of this invention in a unit dosage form or to combine one or more of the compounds with other known diluretics and saluretics or with other

TABLE I

| Ex. | R | $X^1$ | $X^2$ | $X^3$ | $-C_nH_{2n}-$ |
|---|---|---|---|---|---|
| 8 | $-CH(CF_3)(CH_3)$ | Cl | H | $-CH_3$ | $-CH_2-$ |
| 9 | $-CH(CH_3)_2$ | Br | Cl | Cl | $-CH_2-$ |
| 10 | $-CH_2-CF_3$ | Br | $-CH_3$ | $-CH_3$ | $-CH_2-$ |
| 11 | $-CH_2-CH_3$ | Cl | $-CH_3$ | $-CH_3$ | $-CH_2-$ |
| 12 | $-CH_2-CH_3$ | Br | $-CH=CH-CH=CH-$ | | $-CH_2-$ |
| 13 | $-CH(CH_2-CH_2)(CH_2-CH_2)$ (cyclopentyl) | Br | H | Cl | $-CH_2-$ |
| 14 | $-CH_2-CH_3$ | Cl | Cl | $-CH_3$ | $-CH_2-$ |
| 15 | $-CH_2-CH_3$ | Cl | $-CH_3$ | Cl | $-CH_2-$ |
| 16 | $-CH_2-CH_3$ | Cl | $-CH_2-CH_2-CH_2-$ | | $-CH_2-$ |
| 17 | $-C_6H_5$ (phenyl) | Br | H | Cl | $-CH_2-$ |
| 18 | $-CH(CH_2-CH_2)(CH_2-CH_2)CH-CH_3$ (methylcyclopentyl) | Cl | H | Cl | $-CH_2-$ |
| 19 | $-CH_2-CH_3$ | Br | $-CH_2-CH_2-CH_2-CH_2-$ | | $-CH_2-$ |
| 20 | $-CH_2-C_6H_4-Cl$ | Cl | H | Cl | $-CH_2-$ |
| 21 | $-CH(CH_2-CH_2)(CH_2-CH_2)CH_2$ (cyclohexyl) | Cl | Cl | Cl | $-CH_2-$ |
| 22 | $-CH_2-CH_3$ | Cl | H | Cl | $-CH(CH_3)-$ |
| 23 | $-CH_2-CH_3$ | Br | H | Cl | $-CH[CH(CH_3)_2]-$ |
| 24 | $-O-C_6H_5$ | Cl | H | $-CH_3$ | $-CH_2-$ |
| 25 | $-CH_2-C_6H_5$ | Cl | H | $-CH_3$ | $-CH_2-$ |
| 26 | $-CH_2-C_6H_4-(CH_2)_2-CH_3$ | Br | Cl | Cl | $-CH_2-$ |
| 27 | $-CH_2-CH(CH_3)_2$ | Br | H | Cl | $-CH_2-$ |
| 28 | $-CH_2-CH_3$ | Cl | H | I | $-CH_2-$ |
| 29 | $-CH_2-CH_3$ | Cl | H | F | $-CH_2-$ |
| 30 | $-CH_2-CH_3$ | Cl | H | Br | $-CH_2-$ |
| 31 | $-CH_2-CH_3$ | I | Cl | Cl | $-CH_2-$ |

The products (I) of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a {[2-(halomethyl)alkanoyl]phenoxy}alkanoic acid ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it desired therapeutic and/or nutritive agents in dosage unit form.

The following example is included to illustrate the preparation of a representative dosage form:

EXAMPLE 32

Dry-filled capsules containing 50 mg. of active ingredient per capsule

| | Per capsule, mg. |
|---|---|
| {2,3-dichloro-4-[2-(chloromethyl)butyryl]phenoxy}-acetic acid | 50 |
| Lactose | 144 |
| Magnesium stearate | 6 |
| Capsule size No. 3 | 200 |

The {2,3-dichloro-4-[2-(chloromethyl)butyryl]phenoxy}-acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the {[2 - (halomethyl)alkanoyl]phenoxy}alkanoic acid products of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

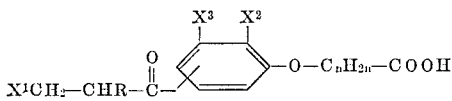

wherein R is lower alkyl, trifluoromethyl substituted lower alkyl, lower cycloalkyl, mononuclear aryl, mononuclear aralkyl or mononuclear aryloxy; $X^1$ is halogen; $X^2$ and $X^3$ are similar or dissimilar members selected from hydrogen, halogen, lower alkyl and, taken together, two X radicals on adjacent carbon atoms of the benzene ring may be joined to form an hydrocarbylene chain containing from 3–4 carbon atoms between their points of attachment and $n$ is an integer having a value of 1–4; and the nontoxic, pharmacologically acceptable lower alkyl esters, amide, lower alkylamide and di-lower alkylamide derivatives thereof.

2. A compound according to claim 1 wherein R is lower alkyl or trifluoromethyl substituted lower alkyl and $X^2$ and $X^3$ are similar or dissimilar members selected from hydrogen, halogen or lower alkyl.

3. A compound according to claim 1 having the formula:

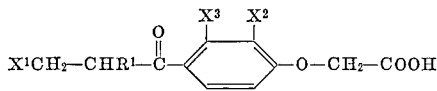

wherein $R^1$ is lower alkyl or trifluoromethyl substituted lower alkyl; $X^1$ is halogen; $X^2$ is hydrogen, halogen or lower alkyl and $X^3$ is halogen or lower alkyl; and the nontoxic, pharmacologically acceptable lower alkyl esters, amide, lower alkylamide and di-lower alkylamide derivatives thereof.

4. The compound of claim 3 wherein $R^1$ is lower alkyl and $X^2$ and $X^3$ are halogen.

5. The compound of claim 3 wherein $R^1$ is lower alkyl; $X^2$ is hydrogen and $X^3$ is halogen.

6. The compound of claim 3 wherein $R^1$ is trifluoromethyl substituted lower alkyl; $X^2$ is hydrogen and $X^3$ is lower alkyl.

7. The compound of claim 3 wherein $R^1$ is trifluoromethyl substituted lower alkyl and $X^2$ and $X^3$ are lower alkyl.

8. The compound of claim 3 wherein $R^1$ is ethyl; $X^1$ is chloro and $X^2$ and $X^3$ are chloro.

9. The compound of claim 3 wherein $R^1$ is ethyl; $X^1$ is bromo; $X^2$ is hydrogen and $X^3$ is chloro.

10. The compound of claim 3 wherein $R^1$ is ethyl; $X^1$ is chloro; $X^2$ is hydrogen and $X^3$ is chloro.

11. The compound of claim 1 wherein R is ethyl; $X^1$ is bromo; $X^2$ and $X^3$, taken together, are joined to form a tetramethylene chain; $n$ is an integer having a value of 1 and the alkanoyl radical $X^1CH_2$—CHR—CO— is in a position para to the oxyacetic acid moiety.

12. The compound of claim 1 wherein R is 4-chlorobenzyl; $X^1$ is chloro; $X^2$ is hydrogen; $X^3$ is chloro; $n$ is an integer having a value of 1 and the alkanoyl radical $X^1CH_2$—CHR—CO— is in a position para to the oxyacetic acid moiety.

13. The compound of claim 1 wherein R is phenoxy; $X^1$ is chloro; $X^2$ is hydrogen; $X^3$ is methyl; $n$ is an integer having a value of 1 and the alkanoyl radical $$X^1CH_2\text{—CHR—CO—}$$

is in a position para to the oxyacetic acid moeity.

References Cited

UNITED STATES PATENTS

| | | | |
|---|---|---|---|
| 3,398,188 | 8/1968 | Schultz | 260—521 |
| 3,317,581 | 5/1967 | Schultz | 260—521 |

OTHER REFERENCES

Migdrichian: Organic Synthesis, vol. II, p. 864.

LORRAINE A. WEINBERGER, Primary Examiner

E. J. GLEIMAN, Assistant Examiner

U.S. Cl. X.R.

260—520, 521, 559; 424—308, 317, 324